United States Patent [19]

Fleischer et al.

[11] Patent Number: 5,260,978
[45] Date of Patent: Nov. 9, 1993

[54] SYNCHRONOUS RESIDUAL TIME STAMP FOR TIMING RECOVERY IN A BROADBAND NETWORK

[75] Inventors: Paul E. Fleischer, Little Silver; Chi-Leung Lau, Marlboro, both of N.J.

[73] Assignee: Bell Communications Research, Inc., Livingston, N.J.

[21] Appl. No.: 969,592

[22] Filed: Oct. 30, 1992

[51] Int. Cl.⁵ .............................................. H04L 7/00
[52] U.S. Cl. .................... 375/106; 375/111; 375/113
[58] Field of Search ............... 370/100.1, 94.2, 94.1; 375/106, 107, 110, 110, 113, 118

[56] References Cited

U.S. PATENT DOCUMENTS 4,961,188 10/1990 Lau ...................................... 370/94.2

OTHER PUBLICATIONS

"Jitter Reduction in ATM Networks," Julio Gonzales and Jean-Paul Le Meur Proceedings ICC '91, 9.4.1–9.4.6.

"Jitter and Clock Recovery for Periodic Traffic in Broadband Packet Networks," R. P. Singh, S. H. Lee and C. K. Kim, Presented at IEEE Globecom '88, Florida, Dec. 1988.

"Adaptive Clock Synchronization for Real-Time Traffic in Broadband Packet Networks" R. P. Singh and S. H. Lee, Presented-8th Eur. Conf. on Electrotechnics, Stockholm, Sweden, Jun. 1988.

Primary Examiner—Curtis Kuntz
Assistant Examiner—Hai H. Phan
Attorney, Agent, or Firm—Leonard Charles Suchyta; Stephen M. Gurey

[57] ABSTRACT

A Residual Time Stamp (RTS) technique provides a method and apparatus for recovering the timing signal of a constant bit rate input service signal at the destination node of a synchronous ATM telecommunication network. At the source node, a free-running P-bit counter counts cycles in a common network clock. At the end of every RTS period formed by N service clock cycles, the current count of the P-bit counter, defined as the RTS, is transmitted in the ATM adaptation layer. Since the absolute number of network clock cycles likely to fall within an RTS period will fall within a range determined by N, the frequencies of the network and service clocks, and the tolerance of the service clock, P is chosen so that the $2^P$ possible counts, rather than representing the absolute number of network clock cycles an RTS period, provide sufficient information for unambiguously representing the number of network clock cycles within that predetermined range. At the destination node, a pulse signal is derived in which the periods are determined by the number of network clock cycles represented by the received RTSs. This pulse signal is then multiplied in frequency by N to recover the source node service clock.

10 Claims, 3 Drawing Sheets

SYNCHRONOUS RESIDUAL TIME STAMP FOR TIMING RECOVERY IN A BROADBAND NETWORK

BACKGROUND OF THE INVENTION

This invention relates to timing recovery of a source node service clock frequency at a destination node in a broadband asynchronous transfer mode (ATM) network where the source and destination nodes receive reference timing signals derived from a single master clock.

Asynchronous Transfer Mode (ATM) is a packet oriented technology for the realization of a Broadband Integrated Services Network (BISDN). By using ATM, network resources can be shared among multiple users. Moreover, various services including voice, video and data can be multiplexed, switched, and transported together under a universal format. Full integration will likely result in simpler and more efficient network and service administration and management. However, while conventional circuit-switching is optimized for real-time, continuous traffic, ATM is more suitable for the transport of bursty traffic such as data. Accommodation of constant bit rate (CBR) services is, however, an important feature of ATM, both for universal integration and for compatibility between existing and future networks. In the transport of a CBR signal through a broadband ATM network, the CBR signal is first segmented into 47-octet units and then mapped, along with an octet of ATM Type I Adaptation Layer (AAL) overhead, into the 48-octet payload of the cell. The cells are then statistically multiplexed into the network and routed through the network via ATM switches.

It is essential to the proper delivery of such CBR service traffic in a broadband network that the clock controlling the destination node buffer be operating at a frequency precisely matched to that of the service signal input at the source node in order to avoid loss of information due to buffer over- or under-flow. However, unlike the circuit-switched transport of service data wherein the clock frequency at the destination node may be traced directly back to that of the source node by the regular, periodic arrival of the CBR traffic, transport in an ATM network inherently results in cell jitter, i.e. the random delay and aperiodic arrival of cells at a destination node, which essentially destroys the value of cell arrival instances as a means for directly recovering the original service signal input frequency.

Such cell jitter, generally the result of the multiplexing of transport cells in the broadband network and the cell queuing delays incurred at the ATM switches in the network, is substantially unpredictable. Thus, little is known about the cell arrival time beyond the fact that the average cell delay is a constant, assuming that the ATM network provides sufficient bandwidth to ensure against loss of cells within the network. As a means for closely approximating the service signal frequency at the destination node, some consideration had previously been given to utilizing a direct extension of circuit-switched timing recovery practices which rely entirely upon a buffer fill signal as the basis for recovery of the source timing. However, due to the lack of knowledge of statistics of the cell jitter, this approach would have required a phase-locked loop with very low cut-off frequency (in the order of a few Hz) and would thus have resulted in excessive converging time and degradation of jitter and wander performance.

A number of schemes have been proposed to improve upon such a conventional manner of recovering service timing in the presence of cell jitter, yet none has achieved this end economically and without extensive control systems of notable complexity. Singh et al., for example, in "Adaptive Clock Synchronization Schemes For Real-Time Traffic In Broadband Packet Networks," 8th European Conference on Electrotechnics, Stockholm, Sweden, June 1988, and "Jitter And Clock Recovery For Periodic Traffic In Broadband Packet Networks," IEEE Globecom '88, Florida, December 1988, have proposed algorithms which attempt to more closely estimate cell jitter statistics and derive timing recovery from those indications. These adaptive approaches, suggested to be applicable to both synchronous and non-synchronous networks, rely upon the interaction of increasingly complex algorithms which would require the noted extensive controls for implementation.

These prior art schemes described above can be classified as non-synchronous techniques, which are based on the simple fact that the expected value of the network cell jitter is zero and thus rely on phase filtering. Synchronous techniques, on the other hand, utilize the fact that common timing is available at both the transmitter and the receiver. In a synchronous broadband ATM network, such as the Synchronous Optical Network (SONET) prescribed by American National Standard, ANSI T1.105-1988, "Digital Hierarchy Optical Interface Rates and Formats Specification," Mar. 10, 1988, the network source and destination node control clocks are synchronized to the same timing reference. As a result, there is no necessity for relying upon any extraneous phenomenon such as instants of cell arrival to provide a datum base for determining the relative frequencies of those control clocks. The effect of cell jitter caused by multiplexing and switching delays in the network is therefore of little consequence in any procedure for circuit transporting CBR service, which is based, as is the present invention, on an actual synchrony of node timing. Thus being devoid of concern for cell jitter, this process is free to simply determine the difference in frequency between the CBR service signal input at the source node and the source/destination node timing clock(s).

U.S. Pat. No. 4,961,188 issued on Oct. 2, 1990 to Chi-Leung Lau, co-inventor herein, discloses a synchronous frequency encoding technique (SFET) for clock timing in a broadband network. The SFET takes advantage of the common timing reference at both the source and the receiver. At the source, the asynchronous service clock is compared to the network reference clock. The discrepancy between properly chosen submultiples of the two clocks is measured in units of a preassigned number of slip cycles of network clock. This clock slip information is conveyed via a Frequency Encoded Number (FEN) which is carried in the ATM Adaptation Layer (AAL) overhead. At the receiver, the common network clock and the FEN are used to reconstruct the service clock. This timing recovery process does not rely on any statistics of the cell jitter except that it has a known, bounded amplitude. Therefore, the recovered clock has jitter performance comparable to that of the circuit-switched network.

An alternative proposed approach is known as Time Stamp (TS). In the Time Stamp approach (see, for example, Gonzales et al, "Jitter Reduction in ATM Networks", Proceedings ICC'91, 9.4.1–9.4.6), the network clock is used to drive a multi-bit counter (16-bits in the proposal), which is sampled every fixed number of generated cells (e.g., 16). Thus, a fixed number, N, of service clocks cycles is used as the measuring yardstick. The sampled value of the 16-bit counter is the TS that inherently conveys the frequency difference information. Because of the size of the TS (2 octets), it has been proposed that the TS be transmitted via the Convergence Sublayer (CS) overhead. Thus the TS is a 16-bit binary number occurring once every N service clock cycles. Differences in successive TSs represent the quantized values of M, where M is the number of network clock cycles during the fixed TS period. At the receiver, the TS period is reconstructed from the received TSs and the network clock. A free-running 16-bit counter is clocked by the network clock and the output of the counter is compared to the received TSs which are stored in a TS FIFO. A pulse is generated whenever there is a match between the TS and the 16-bit counter. The service clock is recovered by supplying the resultant pulse stream as the reference signal to a multiply-by-N phase locked loop (PLL).

A comparison of the SFET approach and the TS approach reveals advantages and disadvantages for each. In the SFET approach there is a relatively stringent requirement on the derived network clock since it must be slightly larger than the service clock. Advantageously, however, a convergence sublayer is not required to transmit the FEN and only small overhead bandwidth is required to transmit the necessary information. On the other hand, the TS approach is more flexible in that it does not require stringent relationships between the service clock and the network derived clock and can therefore support a range of service bit rates. Disadvantageously, however, a rigid convergence sublayer structure is required to transmit the TS, which adds complexity and makes inefficient use of the overhead bandwidth.

An object of the present invention is to achieve synchronous timing recovery with an approach that has the advantages of both the SFET and TS approaches, specifically, the efficiency of SFET and the flexibility of TS.

SUMMARY OF THE INVENTION

As described hereinabove, the TS approach requires a large number of bits (16-bits in the example), to represent the number of network clock cycles within a time interval defined by a fixed number (N) of service clock cycles. In accordance with the present invention, the number of bits required to represent the number of network clock cycles within that time interval is substantially reduced. This is possible through the realization that the actual number of network clock cycles, M (where M is not necessarily an integer), deviates from a nominal known number of cycles by a calculable deviation that is a function of N, the frequencies of the network and service clocks, and the tolerance of the service clock. Specifically, therefore, rather than transmitting a digital representation of the quantized actual number of network clock cycles within the interval, only a representation of that number as it exists within a defined window surrounding an expected, or nominal, number of network clock pulses is transmitted from a source node to a destination node in an ATM network. This representation will be referred to hereinafter as the Residual Time Stamp (RTS). By selecting the number of bits, P, so that all $2^P$ possible different bit patterns uniquely and unambiguously represent the range of possible numbers of network clock cycles within the fixed interval that is defined by N service clock cycles, the destination node can recover the service clock from the common network clock and the received RTS.

At the source node, a free-running P-bit counter counts clock cycles in a clock signal derived from the network clock. The service clock, which is derived from the incoming data signal to be transmitted over the ATM network, is divided by the factor of N to produce a pulse signal having a period (the RTS period) which defines the time interval for measuring the number (modulo $2^P$) of derived network clock pulses. At the end of each RTS period, the current count of the free-running P-bit counter is sampled. That sampled value is the RTS, which is transmitted via the adaptation layer. Since the service clock from which the RTS period is defined and the derived network clock are neither synchronized nor integrally related in frequency, the actual number of derived network clock cycles in a RTS period is unlikely to be an integer. Thus, when sampled at the end of each RTS period, the increment in the count of the P-bit counter is a quantized version of the count (modulo $2^P$) of pulses in the RTS interval as modified by any accumulated fractional counts from a previous interval.

At the destination node, after the AAL is processed, the successive RTSs are converted into a pulse signal which has periods between pulses defined by the fixed integral numbers of derived network clock pulses that correspond to the conveyed RTS periods. Specifically, a free-running P-bit counter is driven by the derived network clock. A comparator compares this count with a stored received RTS and produces a pulse output upon a match. Since the count of the P-bit counter matches the stored RTS every $2^P$ derived network clock cycles, comparator output pulses that do not actually represent the end of the RTS period are inhibited by gating circuitry. This gating circuitry includes a second counter that counts the derived network clock cycles occurring since the end of the previous RTS period. When this second counter reaches a count equal to the minimum possible number of derived network clock pulses within an RTS period, the next comparator pulse output produced upon a match between the RTS and the count of the P-bit counter, is gated-through to the output and resets the second counter. The resultant gated through output pulse stream drives a multiply-by-N phase locked loop to recover the service clock.

DETAILED DESCRIPTION

Figure 1:
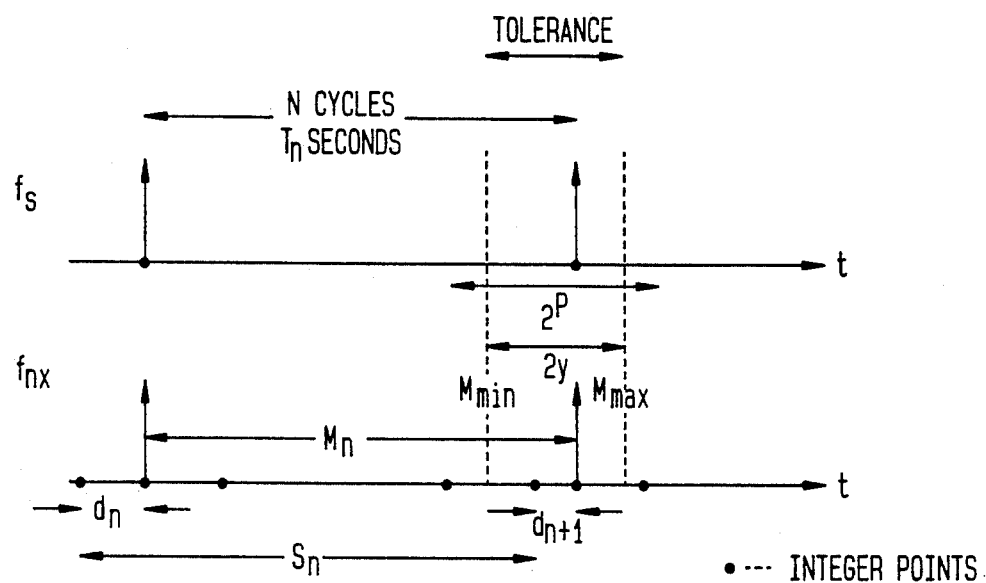
FIG. 1 are timing diagrams showing the RTS concept of the present invention.

The concept of the Residual Time Stamp is described with reference to FIG. 1. In FIG. 1, and in the description hereinafter, the following terminology is used:

$f_n$—network clock frequency, e.g. 155.52 MHz;
$f_{nx}$—derived network clock frequency, $$f_{nx} = \frac{f_n}{x},$$

where x is a rational number;
$f_s$—service clock frequency;
N—period of RTS in units of the service clock ($f_s$) cycles;
$T_n$—the n-th period of the RTS in seconds;
$\pm\epsilon$—tolerance of the source clock frequency in parts per million;
$M_n$ ($M_{nom}$, $M_{max}$, $M_{min}$)—number of $f_{nx}$ cycles within the n-th (nominal, maximum, minimum) RTS period, which are, in general, non-integers.

As can be noted in FIG. 1, during the n-th period, $T_n$, corresponding to N service clock cycles, there are $M_n$ network derived clock cycles. As aforenoted, since the service clock and the network clock are neither synchronized nor integrally related in frequency, this number of derived network clock cycles is not an integer. Since all practical timing recovery techniques transmit only integer values, the fractional part of $M_n$ must be dealt with. Simple truncation or rounding of the fractional part in each RTS time slot is not permissible, as this would lead to a "random walk" type error accumulation. Rather, it is necessary to accumulate the fractional parts at the transmitter and use the accumulated value to modify the transmitted integer quantity. Since it is most convenient to generate RTS by an asynchronous counter, as will be described hereinafter in conjunction with the description of FIG. 2, a "truncation" operation is natural, reflecting the fact that an asynchronous counter's output does not change until the subsequent input pulse arrives. To formalize these notions, $S_n$ is defined as the truncated value of $M_n$ after accounting for the left over fractional part, $d_n$, from the (n−1)-th interval, viz., $$S_n = [M_n + d_n] \quad (1)$$

and $$d_{n+1} = d_n + M_n - S_n \quad (2)$$

where [a] denotes the largest integer less than or equal to a. Since for accurate clocks, the range of $M_n$ is very tightly constrained, i.e., $M_{max} - M_{min} = 2y \ll M_n$, the variation in $S_n$ is also much smaller than its magnitude. It follows from Equation (1) that $$[M_{min} + d_n] \leq S_n \leq [M_{max} + d_n] \quad (3)$$

Since the maximum and minimum of $d_n$ are 1 and 0 respectively, $S_n$ is bounded by, $$[M_{min}] \leq S_n \leq [M_{max}] + 1 \quad (4)$$

This implies, that the most significant portion of $S_n$ carries no information and it is necessary to transmit only its least significant portion. This, therefore, is the essential concept of the RTS. The minimum resolution required to represent the residual part of $S_n$ unambiguously is a function of N, the ratio of the network derived frequency to the service frequency, and the service clock tolerance, $\pm\epsilon$. The maximum deviation, y, between the nominal number of derived network clock pulses in an RTS period, $M_{nom}$, and the maximum or minimum values of M ($M_{max}$ or $M_{min}$) is given by, $$y = N \times \frac{f_{nx}}{f_s} \times \epsilon \quad (5)$$

where $M_{nom}$ equals $$N \times \frac{f_{nx}}{f_s}.$$

A specific numerical example can be considered for clarity of understanding. As illustrative derived network clock frequency and service clock frequencies could be given by $f_{nx} = 155.52$ MHZ (for x=1), and $f_s = 78.16$ MHz (nominal), respectively. A typical RTS sampling period (N) is 3008, which corresponds to a period of 8 cells and a 47-octet payload per cell (47 bytes/cell × 8 bits/byte × 8 cells per RTS period). Using these numbers, $M_{nom} = 5985.2119$. If it is further reasonable to assume that the service clock tolerance is 200 parts per million, i.e., $\pm 200 \times 10^{-6}$. From equation (5), therefore, y=1.197, which demonstrates that it is superfluous to transmit the full $S_n$ in each RTS sampling period and transmission of the last few (P) bits of $S_n$ is sufficient. This P-bit sample is the Residual-TS (RTS).

Figure 2:
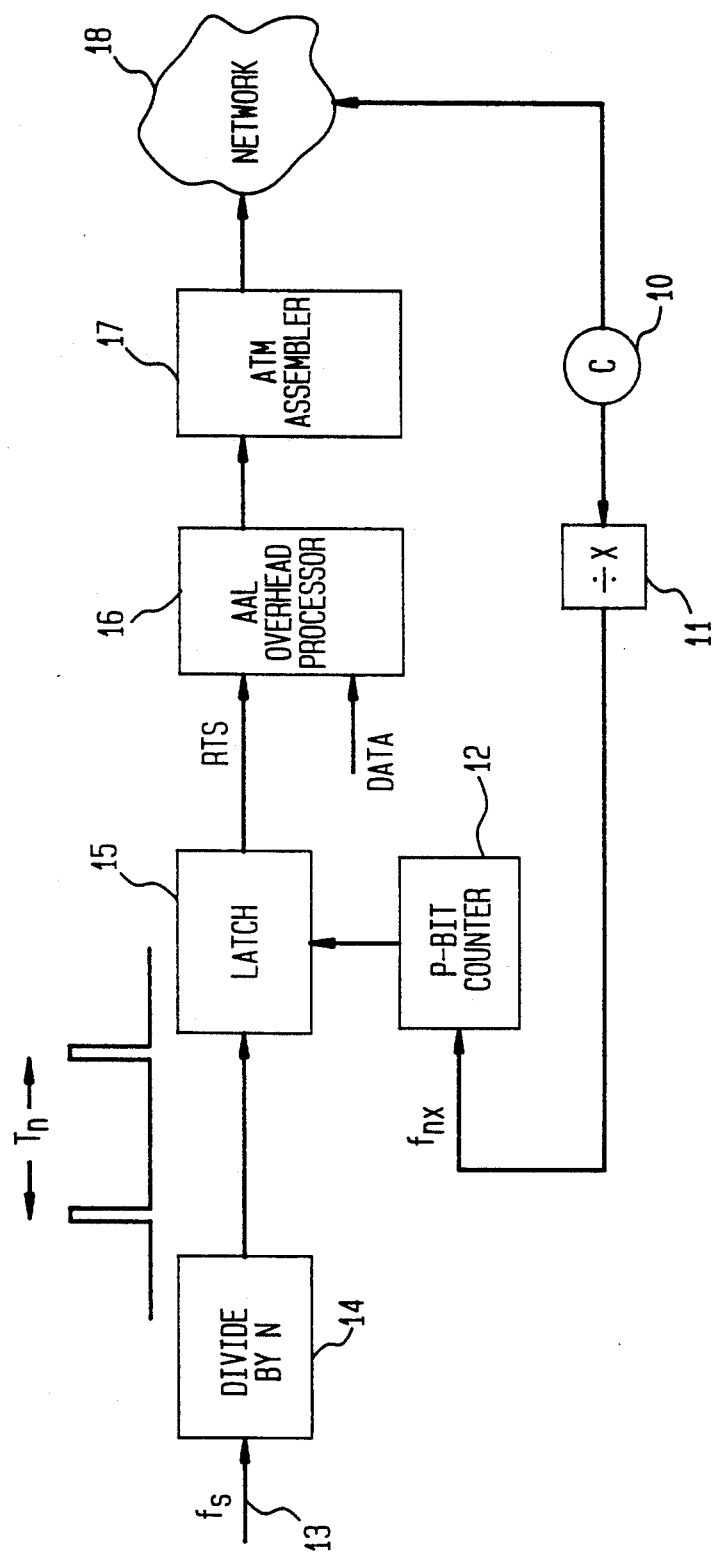
FIG. 2 is a block diagram showing apparatus, in accordance with the present invention, for generating the RTS at the source node of an ATM network.

FIG. 2 is a block diagram of the source node of an ATM network showing apparatus for generating and transmitting the RTS. The basic network clock, C, shown at 10, serves as the reference for timing of all nodes of the synchronous network being here considered. This clock, having a frequency $f_n$, is divided in frequency by a rational factor x by a divider 11 to produce a derived network clock having a frequency $f_{nx}$. Preferably, x would be an integer value. The dividing factor is chosen so that the P bits available can unambiguously represent the number of derived network clock cycles within an RTS period. In the case where $$\frac{f_{nx}}{f_s}$$

is less than or equal to two, as in the example above, it can be shown that a 3-bit RTS is sufficient.

The derived network clock, $f_{nx}$, drives a P-bit counter, which is continuously counting these derived network clock pulses, modulo $2^P$. The service clock, $f_s$, on lead 13, which is derived from the service data signal (not shown) to be transmitted over the ATM network, is divided in frequency by N, the desired RTS period in units of $f_s$ cycles, by divide-by N circuit 14. As shown in FIG. 2, the output of divider 14 is a pulse signal in which $T_n$ is its n-th period. At every T seconds (N source clock cycles) latch 15 samples the current count of counter 12, which is then the P-bit RTS to be transmitted. As aforedescribed, this number represents the residual part of $S_n$ and is all that is necessary to be transmitted to recover the source clock at the destination node of the network.

Each successive RTS is incorporated within the ATM adaptation layer overhead by AAL processor 16. The associated data to be transmitted (not shown) is also processed by processor 16 to form the payload of the cells, which are then assembled by an ATM assembler 17, which adds an ATM header for transmission over the network 18.

With reference again to the previous example, a four-bit counter (P=4) can be assumed to be used. Since $M_{nom}=5985.2119$ and 5985.2119 (modulo 16)=1.2119, a typical RTS output sequence when the source is at nominal frequency will be as follows;

$$\ldots 5,6,7,9,10,11,12,13,15,1,2,\ldots$$

Since the counter 16, in effect, quantizes by truncation, the RTS changes only by integer values. The changes in RTS are such that their average is exactly equal to $M_{nom}$ (modulo $2^P$). In this example, the changes are either 1 or 2 with the change of 2 occurring either every 4 or 5 RTSs in such a way that the average interval is $1/0.2119=4.7198$. In general, successive RTSs are related by $$RTS_{n+1}=RTS_n+S_n=RTS_n+[d_n+M_n](\text{modulo } 2^P) \qquad (6)$$

In order to guarantee that no information is lost due to the modulo arithmetic, i.e., that the transmitted RTS represents $S_n$ unambiguously, it can be seen from equation (4) that the number of bits used for transmission must satisfy:

$$2^P \geq [M_{max}]-[M_{min}]+2 \qquad (7)$$

Thus, in the example above, the number of bits allocated to the RTS must be 3 or greater. It can be noted that the number of bits necessary to unambiguously represent the number of derived network clock cycles within the RTS period is substantially less than the number of bits that would be required to represent the absolute number of clock cycles within the same interval. In the example above, for example, a 13-bit number would be required to represent $M_{nom}$.

Figure 3:
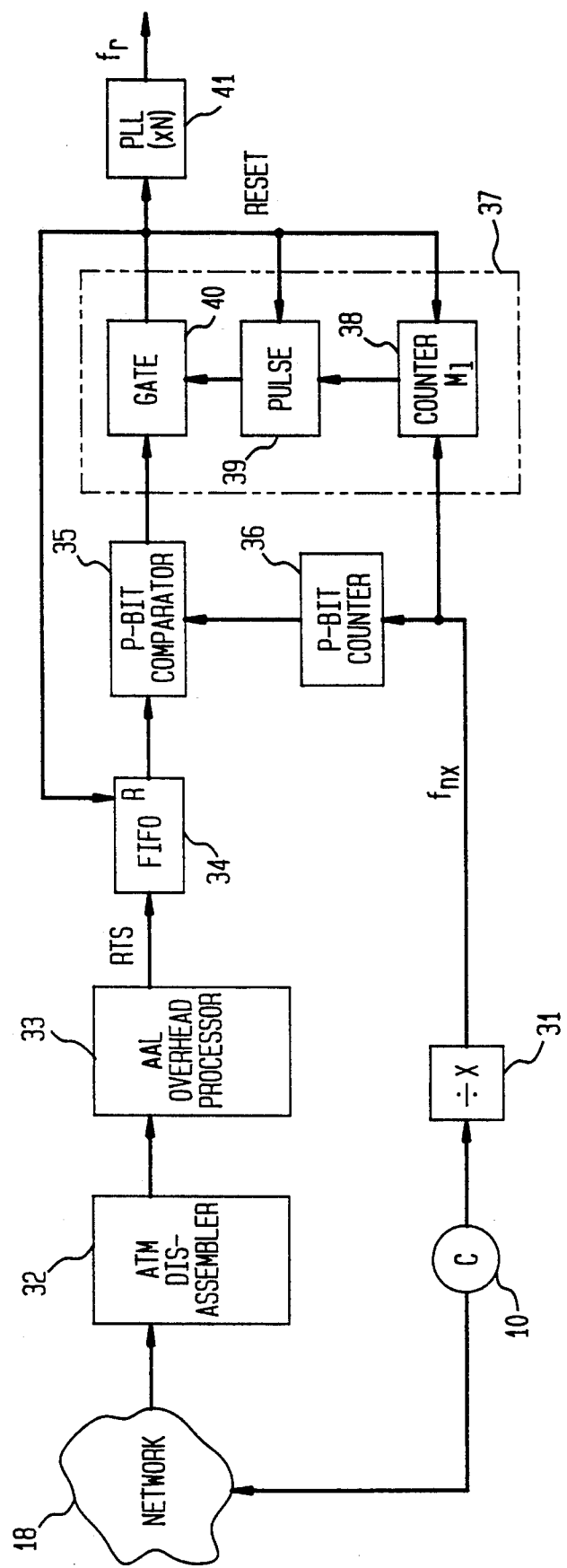
FIG. 3 is a block diagram showing apparatus, in accordance with the present invention, for reconstructing the service clock at the destination node of an ATM network.

If equation (7) is satisfied, knowledge of $M_{nom}$ in the receiver at the destination node along with the received RTSs can be used to reproduce the service clock from the synchronous network clock. FIG. 3 shows one receiver implementation for reproducing the service clock from the received RTSs. At the receiver the common network clock 10 is available as it was at the transmitter. As in the transmitter, a divider 31 divides the network clock frequency, $f_n$ by the same factor of x as divider 11 in the source node, to produce the same derived network clock signal having a frequency $f_{nx}$ as was used by the transmitter at the source node of FIG. 2.

In a structure paralleling the transmitter in FIG. 2, a disassembler 32 processes the ATM headers received from the network 18 and passes the payload to an AAL processor 33. In addition to extracting the transmitted data (not shown), processor 33 extracts the periodic transmitted RTSs, which are sequentially stored in a FIFO 34, which is used to absorb the network cell jitter. The earliest received RTS in FIFO 34 is compared by P-bit comparator 35 with the count of a free running P-bit counter 36, driven by the derived network clock, $f_{nx}$. Whenever the output of counter 36 matches the current RTS, comparator 35 generates a pulse. Since counter 36 is a modulo $2^P$ counter, the RTS in FIFO 34 matches the count of counter 36 every $2^P$ derived network clock pulses, $f_{nx}$. The output of comparator 35 thus consists of a train of pulses that are separated, except for the first pulse, by $2^P$ cycles of the derived network clock. In order to select the output pulse of comparator 35 that corresponds to the end of the fixed period of the transmitted service clocks, which is the period per RTS to be recovered, gating circuitry 37 is employed. Gating circuitry 37, which includes a counter 38, a gating signal generator 39, and an AND gate 40, gates only that pulse output of comparator 35 produced after counting, from the last gated output pulse, a minimum number, $M_l$, of derived network clock cycles. This minimum number, $M_l$, is given by:

$$M_l=[M_{nom}]-2^{(P-1)} \qquad (8)$$

This ensures that $[M_{max}]-2^P<M_l<[M_{min}]$, and thus the gating pulse is guaranteed to select the correct RTS.

Figure 4:
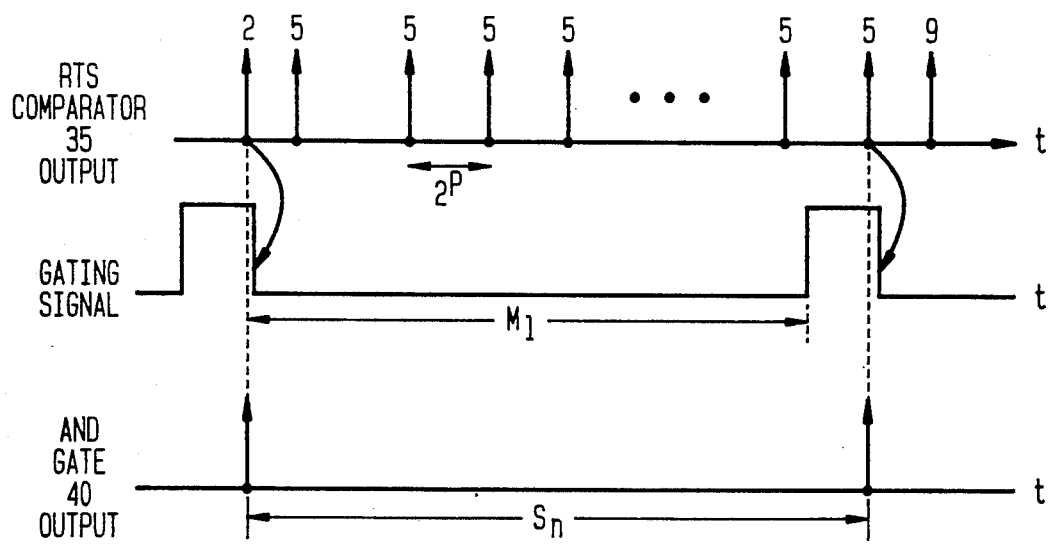
FIG. 4 are timing diagrams showing the gating function at the apparatus of FIG. 3.

The gating function is best explained in conjunction with the timing diagrams of FIG. 4. Initially, it can be assumed that gating signal generator 39 is set to keep AND gate 40 open. Comparator 35 compares the first RTS in FIFO 34 with the free-running count of counter 36. When the count of counter 36 matches this first RTS, shown in FIG. 4 as "2", comparator 35 produces a pulse which is gated through AND gate 40. This gated output pulse resets gating signal generator 39 thereupon turning off AND gate 40, resets the counter of counter 38 to zero, and reads the next stored RTS, "5", in FIFO 34. When counter 36 reaches the count of "5", comparator 35 produces another output pulse. AND gate 40, however, is OFF and remains off until counter 38 counts $M_l$ derived network clock cycles. Therefore, as noted in FIG. 4, all the subsequent matches of the RTS, "5" and the count of counter 36, which occur every $2^P$ derived network clock cycles, are blocked by AND gate 40. These subsequent pulses are blocked until counter 38 reaches a count of that minimum number of clock cycles that can comprise the fixed interval to be recovered from the RTS. After counting $M_l$ derived network clock cycles, counter 38 generates a pulse which signals gating signal generator 39 to open AND gate 40. The next pulse produced by comparator 35 upon the match between the RTS in FIFO 34 and the count of counter 36 is gated through AND gate 40. This pulse, as before, resets counter 38, resets gating signal generator 39, and reads-in the next stored RTS to the output of FIFO 34. The resultant time difference between output pulses of AND gate 40 is the desired fixed time interval, $S_n$, to be recovered from the transmitted RTSs. As previously defined in equation (1), $S_n$ is the truncated value in the nth interval, after accounting for a left over portion from the (n−1)-th interval, of the actual number of derived network clock cycles within the fixed interval defined by N source clock cycles. As can be noted, $S_n$ modulo ($2^P$) is equal to the difference of the RTSs associated with the pulses matched by comparator 35 right before and right after the reset. Thus in FIG. 4, for the n-th period, this is the difference between "5" and "2", or "3", and for the (n+1)-st period, this is the difference between "9" and "5" or "4". The resultant pulse train at the output of gating circuitry 37 can be seen to duplicate the signal at the source node of the network, which is defined by N service clock cycles, as modified by the quantization effect of the RTSs. This pulse stream is input to a multiply-by N phase-locked loop 41 which multiplies the frequency by the factor of N and smooths out the variation of the reproduced periods. The resultant output clock signal, $f_r$, is the reproduced service timing signal, which can be employed by the circuitry at the destination node.

The above-described embodiment is illustrative of the principles of the present invention. Other embodiments could be devised by those skilled in the art without departing from the spirit and scope of the present invention.

What is claimed is:

1. A method of recovering, at a destination node of a packet-based telecommunications network, the timing clock of a service input at a source node of said packet-based telecommunications network, the destination node and the source node having a common network clock, comprising the steps of:
    (a) at the source node, dividing the timing clock of the service input by a factor of an integer N to form residual time stamp (RTS) periods;
    (b) at the source node, counting the network clock cycles modulo $2^P$, where $2^P$ is less than the number of network clock cycles within an RTS period and P is chosen so that the $2^P$ counts uniquely and unambiguously represent the range of possible network clock cycles within an RTS period;
    (c) transmitting from the source node to the destination node an RTS at the end of each RTS period that is equal to the modulo $2^P$ count of network clock cycles at that time;
    (d) determining from the RTSs received at the destination node, the number of network clock cycles in each RTS period;
    (e) generating a pulse signal from the network clock at the destination node in which the period between each pulse in the pulse signal equals the determined number of network clock cycles in the corresponding RTS period; and
    (f) multiplying the frequency of the pulse signal generated in step (e) by the same factor of an integer N used in step (a) to recover the timing clock of the service input.

2. The method of claim 1 wherein the network clock frequency is less than or equal to twice the service clock frequency.

3. A method of recovering, at a destination node of a packet-based telecommunications network, the timing clock of a service input at a source node of said packet-based telecommunications network, the destination node and the source node having a common network clock, comprising the steps of:
    (a) at the source node, dividing the timing clock of the service input by a factor of an integer N to form residual time stamp (RTS) periods;
    (b) at the source node, dividing the network clock by a rational factor to form a derived network clock;
    (c) at the source node, counting the derived network clock cycles modulo $2^P$, where $2^P$ is less than the number of derived network clock cycles within an RTS period and P is chosen so that the $2^P$ counts uniquely and unambiguously represent the range of possible derived network clock cycles within an RTS period;
    (d) transmitting from the source node to the destination node an RTS at the end of each RTS period that is equal to the modulo $2^P$ count of derived network clock cycles at that time;
    (e) at the destination node, dividing the network clock by the same rational factor used at the source node to form a derived network clock equal to the derived network clock at the source node;
    (f) determining from the RTSs received at the destination node, the number of derived network clock cycles in each RTS period;
    (g) generating a pulse signal from the derived network clock at the destination node in which the period between each pulse in the pulse signal equals the determined number of derived network clock cycles in the corresponding RTS period; and
    (h) multiplying the frequency of the pulse signal generated in step (g) by the same factor of an integer N used in step (a) to recover the timing clock of the service input.

4. The method of claim 3 wherein the derived network clock frequency is less than or equal to twice the service clock frequency.

5. Apparatus for recovering, at a destination node of a packet-based telecommunications network, the timing clock of a service input at a source node of said packet-based telecommunications network, the destination node and the source node having a common network clock, comprising at the source node:
    dividing means for dividing the timing clock of the service input by a factor of an integer N to form residual time stamp (RTS) periods;
    counting means connected to the network clock for counting network clock cycles modulo $2^P$, where $2^P$ is less than the number of network clock cycles within an RTS period and P is chosen so that the $2^P$ counts uniquely and unambiguously represent the range of possible network clock cycles within an RTS period; and
    transmitting means, responsive to the RTS periods formed by said dividing means and the count of said counting means, for transmitting over the telecommunications network an RTS at the end of each RTS period that is equal to the modulo $2^P$ count of network clock cycles at that time;
    and comprising at the destination node:
    receiving means for receiving the RTSs transmitted over the telecommunications network by said transmitting means;
    converting means responsive to the received RTSs and the network clock for converting the received RTSs into a pulse signal in which the periods between pulses are determined from the numbers of network clock cycles associated with the counts of network clock cycles within said RTS periods; and
    means for multiplying the frequency of the pulse signal generated by said converting means by the same factor of an integer N used in said dividing means for recovering the timing clock of the service input.

6. Apparatus in accordance with claim 5 wherein the network clock frequency is less than or equal to twice the service clock frequency.

7. Apparatus in accordance with claim 5 wherein said converting means comprises:
    means for sequentially storing the received RTSs;
    means for counting network clock cycles modulo $2^P$;
    comparing means for comparing the modulo $2^P$ count of network clock cycles with a stored RTS and for generating a pulse each time the count of network clock cycles matches the RTS; and
    gating means for gating to said multiplying means, for each sequentially received and stored RTS, the pulse produced by said comparing means that occurs after the counting means counts, starting-in-time from the previous gated pulse, a number of network clock cycles that is greater than a predetermined minimum absolute number of network clock cycles that can occur within any RTS period.

8. Apparatus for recovering, at a destination node of a packet-based telecommunications network, the timing clock of a service input at a source node of said packet-based telecommunications network, the destination node and the source node having a common network clock, comprising at the source node:

first dividing means for dividing the timing clock of the service input by a factor of an integer N to form residual time stamp (RTS) periods;

second dividing means for dividing the network clock by a rational factor to form a derived network clock;

counting means connected to the network clock for counting derived network clock cycles modulo $2^P$, where $2^P$ is less than the number of derived network clock cycles within an RTS period and P is chosen so that the $2^P$ counts uniquely and unambiguously represent the range of possible derived network clock cycles within an RTS period; and transmitting means, responsive to the RTS periods formed by said first dividing means and the count of said counting means, for transmitting over the telecommunications network an RTS at the end of each RTS period that is equal to the modulo $2^P$ count of derived network clock cycles at that time;

and comprising at the destination node:

receiving means for receiving the RTSs transmitted over the telecommunications network by said transmitting means;

means for dividing the network clock by the same rational factor used at the source node to form a derived network clock;

converting means responsive to the received RTSs and the derived network clock for converting the received RTSs into a pulse signal in which the periods between pulses are determined from the numbers of derived network clock cycles associated with the counts of derived network clock cycles within said RTS periods; and means for multiplying the frequency of the pulse signal generated by said converting means by the same factor of an integer N used in said first dividing means for recovering the timing clock of the service input.

9. Apparatus in accordance with claim 8 wherein the derived network clock frequency is less than or equal to twice service clock frequency.

10. Apparatus in accordance with claim 8 wherein said converting means comprises:

means for sequentially storing the received RTSs;

means for counting derived network clock cycles modulo $2^P$;

comparing means for comparing the modulo $2^P$ count of derived network clock cycles with a stored RTS and for generating a pulse each time the count of derived network clock cycles matches the RTS; and gating means for gating to said multiplying means, for each sequentially received and stored RTS, the pulse produced by said comparing means that occurs after the counting means counts, starting-in-time from the previous gated pulse, a number of derived network clock cycles that is greater than a predetermined minimum absolute number of derived network clock cycles that can occur within any RTS period.

* * * * *